Feb. 7, 1939.     H. GRAHAM     2,146,067
PIPE COUPLING
Filed May 18, 1936     2 Sheets-Sheet 1
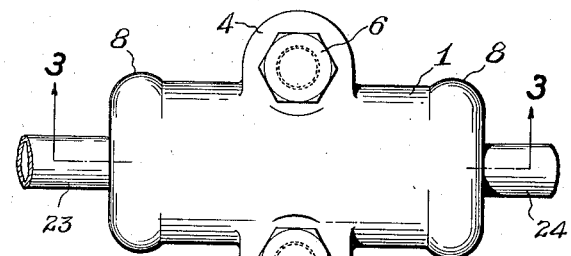
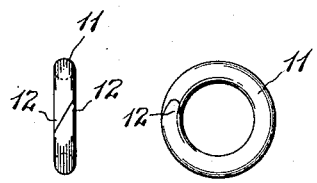
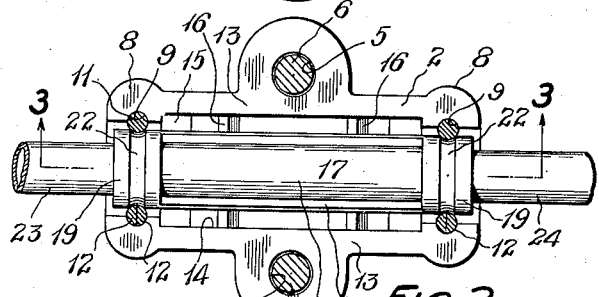
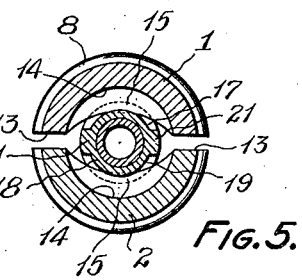
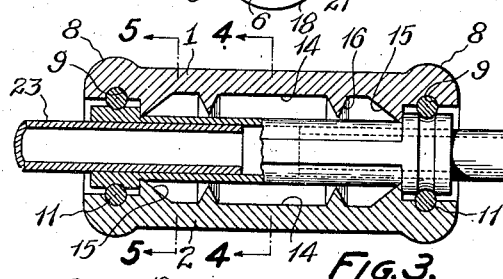
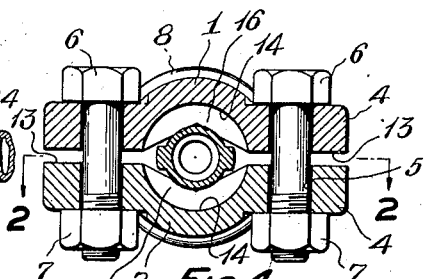
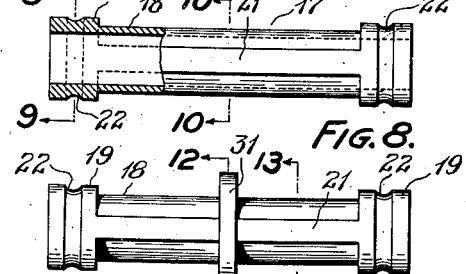
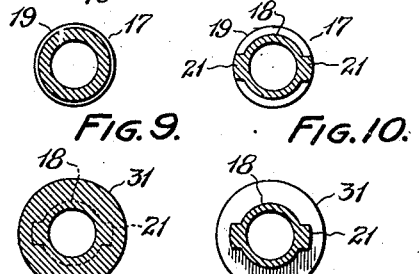
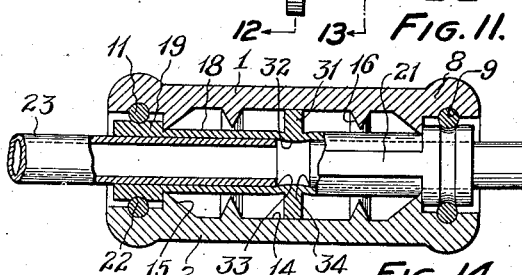
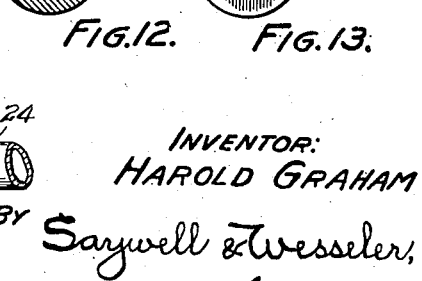
INVENTOR:
HAROLD GRAHAM
BY Saywell & Wesseler,
ATTORNEYS INVENTOR:
HAROLD GRAHAM
BY
Saywell & Wesseler
ATTORNEYS Patented Feb. 7, 1939

2,146,067

UNITED STATES PATENT OFFICE 2,146,067

PIPE COUPLING

Harold Graham, Cleveland, Ohio

Application May 18, 1936, Serial No. 80,256

6 Claims. (Cl. 285—194)

This invention, as indicated, relates to a coupling for pipes and the like. More particularly, this device comprises a threadless coupling having a pair of outer clamping plates adapted to be drawn into clamping engagement with intermediate members and providing a secure connection between the parts adapted to withstand heavy service. The coupling may vary and be utilized for connecting rods or electrical conduits and the like in place of fluid conducting pipes. It is of particular advantage where connections are to be made by persons having access to only simple tools, and when the connections to be made require members to be cut off at different lengths to fit certain spaces within which the installation is being made.

Heretofore threadless couplings have been provided for pipes, rods, and the like, but in most instances such constructions have involved flanging or grooving the ends of the members to be connected so that somewhat expensive machining operations were required. In other instances, the clamping and sealing elements have been of rubber or like material which in the course of time would deteriorate and render the coupling imperfect.

The present invention has for its principal object the provision of a coupling for pipes and the like adapted to provide a secure connection capable of withstanding severe service and which may be readily applied by an unskilled person with the use of simple tools.

Another object of the invention is to provide a coupling member having metallic sealing elements adapted to form a fluid-tight union between the parts to be coupled.

Another object of the invention is to provide a coupling member adapted to be applied to the ends of pipes or conduits which have been sawed off to appropriate lengths and which may be secured in operative relation to each other by a firm clamping engagement which may be readily applied by a person having access to simple tools and with no particular skill.

Another object of the invention is to provide a coupling incorporating a sleeve of relatively soft metal with means for engaging and deforming such sleeve into firm clamping engagement with the elements to be connected.

Another object of the invention is to provide a coupling member comprising a pair of plates adapted to be drawn in clamping engagement upon a sleeve-like member of soft metal and having means associated with said plates for crimping and deforming such sleeve upon the elements to be united so as to provide a secure clamping engagement of the parts.

Another object of the invention is to provide a coupling member particularly adapted to unite sections of electric conduits and to provide for auxiliary circuit connections at such point.

A further object of the invention is to provide a coupling member for pipes and the like wherein a plurality of clamping and sealing elements are formed between the members to be united, whereby a high degree of safety and security is brought about.

A further object of the invention is to provide a device for coupling pipes and the like which requires no complicated and expensive machined parts and which may be applied without the use of special or expensive tools.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain structures embodying the invention, such disclosed means constituting, however, but several of various forms in which the principle of the invention may be used.

In said annexed drawings:

Figure 1 is a top plan view of a structure embodying the principles of the invention;

Figure 2 is a sectional plan view, taken along the line 2—2 shown in Figure 4, looking in the direction of the arrows;

Figure 3 is a central vertical sectional view, taken along the line 3—3 shown in Figures 1 and 2, looking in the direction of the arrows;

Figure 4 is a central transverse sectional view, taken along the line 4—4 shown in Figure 3, looking in the direction of the arrows;

Figure 5 is a transverse sectional view, taken along the line 5—5 shown in Figure 3, looking in the direction of the arrows;

Figure 6 is an end view of a split clamping ring used as a sealing member;

Figure 7 is a side view of the ring shown in Figure 6;

Figure 8 is a side elevation, partly in section, of a clamping sleeve embodying the principles of the invention;

Figure 9 is a transverse sectional view, taken along the line 9—9 shown in Figure 8, looking in the direction of the arrows;

Figure 10 is a central transverse sectional view, taken along the line 10—10 shown in Figure 8, looking in the direction of the arrows;

Figure 11 is a side elevation of a modified form of sleeve embodying the principles of the invention;

Figure 12 is a central transverse sectional view, taken along the line 12—12 shown in Figure 11, looking in the direction of the arrows;

Figure 13 is a transverse sectional view, taken along the line 13—13 shown in Figure 11, looking in the direction of the arrows;

Figure 14 is a central vertical sectional view of a device embodying the principles of the invention, wherein a modified form of sleeve such as is shown in Figure 11 is used;

Figure 15:
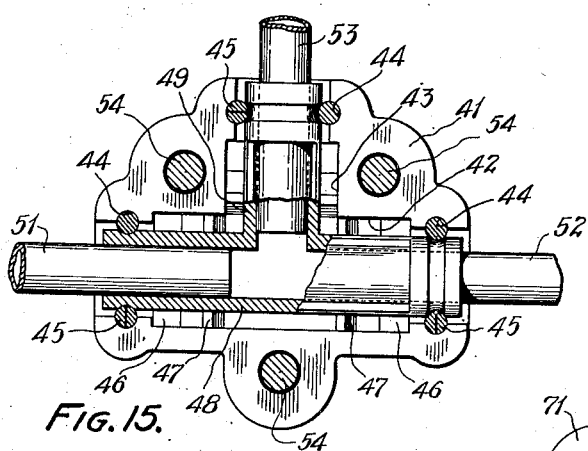
Figure 15 is a plan view, partly in section, showing a T-type of construction embodying the principles of the invention.

The apparatus may take a number of different forms, but the preferred form of construction is shown in Figures 1 to 10, inclusive, and embodies a pair of plates 1, 2, adapted to be drawn into clamping relation with each other by means of a pair of screw bolts or the like, which may be engaged through ears or enlargements 4 formed on the respective plates and centrally apertured to receive said screw bolts. The apertures 5 in the lower plate 2 may be threaded to receive the threaded ends of said screw bolts, or the apertures through the respective ears may provide free passage for the shanks of regulation bolts 6 having nuts 7 on their opposite ends, as shown in Figure 4.

The clamping plates 1, 2, are substantially identical in shape and are preferably formed with slightly enlarged end portions 8 having internal grooves or recesses 9 of a size to engage against split clamping rings 11. The rings are preferably of the type shown in Figures 6 and 7, wherein scarfed ends 12 are provided and adapted to be moved past each other as the plates 1 and 2 are drawn in clamping relation to each other.

The meeting faces of each of the plates 1 and 2 are preferably slightly relieved centrally of their extent so as to have a slightly concave surface 13 intermediate the ends, such construction permitting the plates to be drawn closely together by means of the bolts 6 with such surfaces when in tightly clamped position presenting substantially a straight line from end to end.

The plates, in addition to having the grooves or recesses 9, are formed with enlarged hollow portions 14 centrally provided with beveled enlargements 15 formed on a longer radius adjacent each of the ends and providing drifts or inclined clamping jaws adapted to engage against thinner portions of the sleeve adjacent the ends, as will be hereinafter set forth. Inwardly of the drifts, V-shaped jaw members 16 are provided within the hollow interior portions of the plates, said members being adapted to have gripping engagement with the thinner portions of the sleeve, as will be hereinafter described.

The clamping contact and sealing of the device upon the members to be connected is accomplished by means of a sleeve 17 preferably made of deformable metal, such as copper, brass, or the like. As shown more particularly in Figures 8 to 10, the sleeve comprises a tubular body portion 18 with end portions 19 of greater thickness, such end portions being connected to each other by means of a longitudinal rib 21 at each side of equal thickness with the end portions. A shallow groove 22 may be provided in each end portion to form a seat for the clamping ring. When the device is applied to the ends of the members to be joined, shown in the drawings as the tubes 23, 24, the sleeve 17 is engaged over the ends of such tubes and forms a snug fit therewith. The rings are applied to the shallow grooves of the sleeve before the sleeve is fitted upon the members to be connected, and the plates are then engaged over such rings with the internal grooves pressing against the outer surfaces of the rings and with the longitudinal ribs in the side of the sleeves adjacent the meeting edges of the plates. The drifts 15, it will be noted by reference to Figures 3 and 5, will then be forced into firm contact with the thin walled portions of the sleeves and will also abut the adjacent shoulders provided by the enlarged end portions 19 of the sleeve. The V-shaped jaw members 16 will also contact with the thin-walled portions of the sleeve, as is more clearly shown in Figure 4. This engagement of the drifts and V-shaped jaw members upon the thin-walled body portion of the sleeve will firmly hold the sleeve against the outer surfaces of the members to be connected and prevent endwise movement thereof. At the same time the clamping plates upon the split rings will deform the enlarged end portions of the sleeve into fluid-tight relation therewith, and form a coupling or union of the tubular members 23 and 24 which will be liquid-tight and gas-tight and free of deterioration through long continued use.

In the form of construction shown in Figures 11 to 14, in addition to the gripping and sealing elements above described, the sleeve is formed with a central enlargement 31 of somewhat greater diameter than the diameter of the end portions 19 of the sleeve, and of relatively narrow width. Such construction permits an additional sealing action to be brought about when the plates are drawn toward each other through the deformation of the sleeve at a central point, as is clearly shown in Figure 14. Thus, the enlargement 31, when deformed through the clamping action of the plates, forces the inner walls of the sleeve inwardly and forms an annular convex internal rib 32 intermediate the pipe sections 23, 24, sealing such members against leakage directly at the marginal portions 33, 34, of the respective pipe ends.

Figure 16:
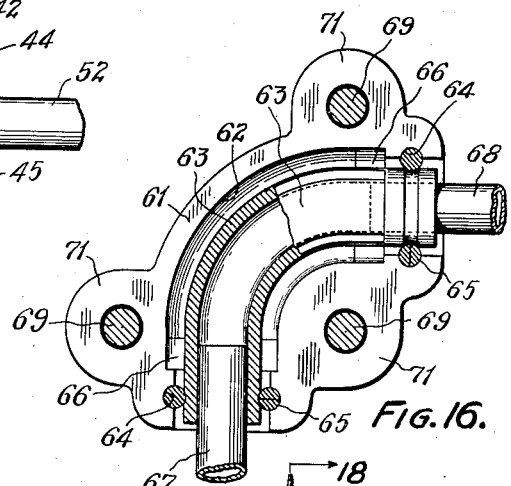
Figure 16 is a plan view, partly in section, showing an elbow type of construction embodying the principles of the invention.

Thus, where a sleeve of the type shown in Figures 11 and 14 is employed, a fluid-tight seal will be had not only at the ends of the sleeve where the split rings are constricted upon the adjacent pipe ends, but at the extreme ends of the pipes through the formation of the internal rib 32 intermediate the sleeve ends.

Where three pipes are to be united in fluid-tight relation, a pair of plates, of the form shown in Figure 15, are utilized, each of such plates 41 having a longitudinal passageway 42 therethrough and also having an auxiliary passageway 43 communicating centrally therewith. The plates are formed with internal grooves or recesses 44 to receive split rings 45 and are provided with drifts 46 and clamping jaws 47 corresponding to those heretofore described in connection with the preferred type of construction. A sleeve 48 similar in form to that heretofore described is provided, such sleeve, however, having an auxiliary sleeve member 49 formed integrally therewith and communicating with the main sleeve at a central point. The pipe members to be connected 51, 52, and 53 are engaged within the respective sleeve apertures in snug fitting relation, and the clamping bolts 54 are then drawn tight and a fluid-tight joint will be provided between each of the pipe members.

Where the pipes to be connected are angularly related in the manner shown in Figure 16, each of the plates 61 is formed with a curved hollow interior passageway 62 adapted to receive a similarly curved sleeve 63. The ends of the plates are recessed to provide grooves 64 to receive the clamping rings 65 and the plates are formed with drifts 66 to engage against the thin-walled portions of the sleeves.

Figure 17:
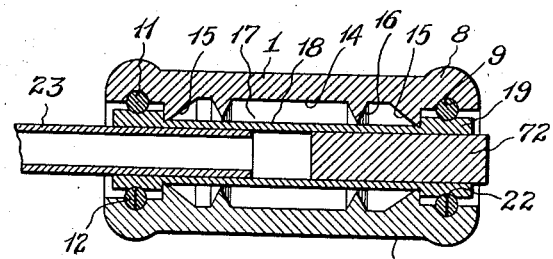
Figure 17 is a central vertical sectional view of a coupling similar to that shown in Figure 3, wherein a solid plug is utilized to provide a seal at the end of a tubular passageway.

The plates may be elongated so as to permit the use of V-shaped jaws adjacent the ends thereof, but in the form shown in Figure 16, the plates provided are of small size and only the drifts are used to anchor the sleeve against the respective ends of the pipes 67, 68, the rings serving to seal the passageway in liquid-tight relation. The plates are clamped to each other by means of a series of bolts 69 extending through apertures formed in a plurality of ears 71 provided on each of the plates.

Where it is desired to seal the end of a passageway, this may be readily accomplished by substituting, in lieu of one of the pipe sections ordinarily inserted in the device, a solid plug 72, such as is shown in Figure 17. The remaining parts of the construction illustrated in Figure 17 correspond with the construction shown in Figure 3, and have been given similar reference characters.

Figure 18:
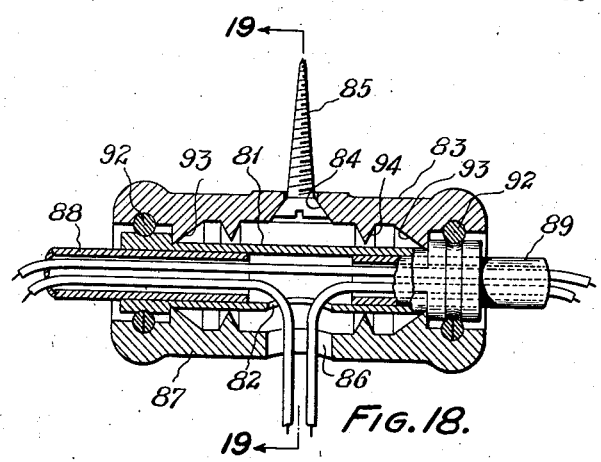
Figure 18 is a central vertical sectional view, taken along the line 18—18 shown in Figure 19, looking in the direction of the arrows, showing the device applied to the ends of a pair of electrical conduit members.
Figure 19:
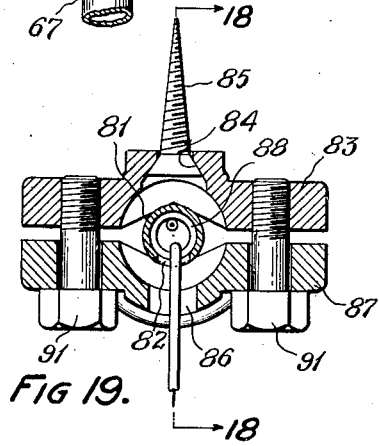
Figure 19 is a central transverse sectional view, taken along the line 19—19, shown in Figure 18, looking in the direction of the arrows.

When the device is used as a coupling for electrical conduits, as is shown in Figures 18 and 19, substantially the same clamping and sealing elements are utilized as those heretofore described, but the sleeve 81 is formed with an aperture 82 through which a branch circuit connection may be made. In such case, one of the clamping plates 83 may be provided with a beveled aperture 84 to receive a fastening screw 85 by means of which the coupling may be secured to a point of support, and opposite said aperture an opening 86 is provided in the companion clamping plate 87, which may be alined with the aperture in the sleeve to permit the passage of the branch circuit connection. The conduit members 88, 89, are engaged within the sleeve 81 and when the screw bolts 91 are moved into clamping relation, the split rings 92 and drifts 93 and clamping jaws 94 will all be drawn tightly against the adjacent portions of the sleeve which will be pressed into firm engagement with the outer surfaces of the conduits and hold the same firmly against displacement.

Through the use of the device shown in Figures 18 and 19, electrical connections may be safely made at practically any desired point along the length of a conduit, since the connection described permits the sawing through of the conduit and the forming of the necessary circuit connections at such point and thereafter sealing the entire assemblage through the action of the clamping plates. The seal may be made fluid-tight, if desired, by utilizing a sealing plug in the opening 86 in the outer plate member. Where a fluid-tight joint is not required, the sleeve 81 may be slitted along one side so that it will be unnecessary to cut each of the circuit wires to engage the coupling member thereover. Where a fluid-tight connection is required, the securing screw 85 may be engaged through an outside lug upon the plate 81 rather than through an aperture in the wall thereof.

As has been indicated, many variations may be made in the construction described in order to accommodate the requirements of particular installations of equipment.

Other modes of applying the principle of my invention may be employed instead of those explained, changes being made as regards the structure herein disclosed, provided the means stated by any of the following claims or the equivalent of such stated means be employed.

I therefore particularly point out and distinctly claim as my invention:

1. A device of the character described having in combination, a sleeve of deformable metal adapted to receive in snug fitting relation the ends of a pair of members to be connected to each other, said sleeve having a smooth interior surface of uniform diameter throughout, and the exterior of said sleeve having an enlarged circumferential central portion and intermediate portions presenting elongated depressions forming thin-walled areas, a pair of outwardly bowed clamping plates formed with grooves extending longitudinally thereof and adapted to be engaged over said sleeve, means associated with said clamping plates for drawing the outwardly bowed portions of the same toward each other in clamping engagement with said sleeve and for forcing the central portion of said sleeve into sealing contact with the extreme ends of the members to be connected, and a pair of endwise directed shoulders formed as segmental ribs in each of the grooves adjacent the ends portions thereof and adapted to be moved slightly endwise to engage the sleeves adjacent the ends of the elongated depressions thereof.

2. A device of the character described having in combination, a sleeve of deformable metal adapted to receive in snug fitting relation the ends of a pair of members to be connected to each other, said sleeve having a smooth interior surface of uniform diameter throughout, and the exterior of said sleeve having intermediate portions presenting elongated depressions forming thin-walled areas, a pair of outwardly bowed clamping plates formed with grooves extending longitudinally thereof and adapted to be engaged over said sleeve, means associated with said clamping plates for drawing the outwardly bowed portions of the same toward each other in clamping engagement with said sleeve the ends of said plates moving endwise from the center line, a pair of endwise directed shoulders formed as segmental ribs in each of the grooves adjacent the end portions thereof and adapted to engage in endwise circumferential contact the sleeves adjacent the ends of the elongated depressions thereof, and a plurality of substantially V-shaped ribs formed in the bottom of the groove of each clamping plate and adapted to apply pressure to the adjacent thin-walled portions of said sleeve.

3. A device of the character described having in combination, a sleeve of deformable metal adapted to receive in snug fitting relation the ends of a pair of members to be connected to each other, said sleeve having a smooth interior surface of uniform diameter throughout, and the exterior of said sleeve having a central circumferential rib and end portions of increased wall thickness connected with each other and with said central rib by side portions of increased wall thickness, said sleeve intermediate said rib and end portions having a plurality of thin-walled areas, a pair of clamping plates formed with grooves extending longitudinally thereof and formed on a radius of curvature substantially the same as that of the thickened end wall portions of said sleeve and slightly less than the radius of curvature of said central circumferential rib, and means associated with said clamping plates for drawing the same toward each other in clamping engagement with said sleeve and forcing the metal centrally of said sleeve into the space between the ends of the members to be connected by reason of the pressure exerted by said clamping plates upon said circumferential rib.

4. A device of the character described having in combination, a sleeve of deformable metal adapted to receive in snug fitting relation the ends of a pair of members to be connected to each other, said sleeve having a smooth interior surface of uniform diameter throughout, and the exterior of said sleeve having a central circumferential rib and end portions of increased wall thickness connected with each other and with said central rib by side portions of increased wall thickness, said sleeve intermediate said rib and end portions having a plurality of thin-walled areas, a pair of clamping plates formed with grooves extending longitudinally thereof and formed on a radius of curvature substantially the same as that of the thickened end wall portions of said sleeve and slightly less than the radius of curvature of said central circumferential rib, means associated with said clamping plates for drawing the same toward each other in clamping engagement with said sleeve and forcing the metal centrally of said sleeve into the space between the ends of the members to be connected by reason of the pressure exerted by said clamping plates upon said circumferential rib, and a pair of endwise directed shoulders formed as segmental ribs in each of the grooves adjacent the end portions thereof and adapted to engage the sleeves adjacent the ends of the thin-walled areas thereof.

5. A device of the character described having in combination, a sleeve of deformable metal adapted to receive in snug fitting relation the ends of a pair of members to be connected to each other, said sleeve having a smooth interior surface of uniform diameter throughout, and the exterior of said sleeve having intermediate portions presenting elongated depressions forming thin-walled areas, a pair of outwardly bowed clamping plates formed with grooves extending longitudinally thereof and adapted to be engaged over said sleeve, means associated with said clamping plates for drawing the outwardly bowed portions of the same toward each other in clamping engagement with said sleeve, cross-recesses formed adjacent the ends of said grooves, split rings engaged within said cross-recesses for deforming said sleeve along circumferential lines into close engagement with the surfaces of the members to be connected, a pair of endwise directed shoulders formed as segmental ribs in each of the grooves adjacent the end portions thereof and adapted to be moved slightly endwise to engage the sleeves adjacent the ends of the elongated depressions thereof, and a plurality of substantially V-shaped ribs formed in the bottom of the groove of each clamping plate and adapted to apply pressure to the adjacent thin-walled portions of said sleeve.

6. A device of the character described having in combination, a sleeve of deformable metal adapted to receive in snug fitting relation the ends of a pair of members to be connected to each other, said sleeve having a smooth interior surface of uniform diameter throughout, and the exterior of said sleeve having a central circumferential rib and end portions of increased wall thickness connected with each other and with said central rib by side portions of increased wall thickness, said sleeve intermediate said rib and end portions having a plurality of thin-walled areas, a pair of clamping plates formed with grooves extending longitudinally thereof and formed on a radius of curvature substantially the same as that of the thickened end wall portions of said sleeve and slightly less than the radius of curvature of said central circumferential rib, means associated with said clamping plates for drawing the same toward each other in clamping engagement with said sleeve and forcing the metal centrally of said sleeve into the space between the ends of the members to be connected by reason of the pressure exerted by said clamping plates upon said circumferential rib, cross-recesses formed adjacent the ends of said grooves, and split rings engaged within said cross-recesses for deforming said sleeve along circumferential lines into close engagement with the surfaces of the members to be connected.

HAROLD GRAHAM.